United States Patent
Kanaya et al.

(10) Patent No.: US 7,775,653 B2
(45) Date of Patent: Aug. 17, 2010

(54) INKJET RECORDING METHOD AND RECORDED MATTER

(75) Inventors: Miharu Kanaya, Nagano-ken (JP); Tetsuya Aoyama, Nagano-ken (JP); Masahiro Hanmura, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 789 days.

(21) Appl. No.: 11/501,172

(22) Filed: Aug. 8, 2006

(65) Prior Publication Data

US 2007/0040882 A1 Feb. 22, 2007

(30) Foreign Application Priority Data

Aug. 19, 2005 (JP) ............................. 2005-238588

(51) Int. Cl.
*G01D 11/00* (2006.01)
*B41J 2/01* (2006.01)
(52) U.S. Cl. ...................................... 347/100; 347/101
(58) Field of Classification Search ................. 347/101, 347/105, 43, 44, 100
See application file for complete search history.

(56) References Cited

U.S. PATENT DOCUMENTS

| 5,547,499 | A | * | 8/1996 | Kawasumi et al. ....... 106/31.25 |
| 6,084,604 | A | * | 7/2000 | Moriyama et al. ............. 347/15 |
| 2005/0036021 | A1 | * | 2/2005 | Ito et al. ...................... 347/100 |
| 2005/0128272 | A1 | * | 6/2005 | Morohoshi et al. .......... 347/100 |

FOREIGN PATENT DOCUMENTS

| EP | 1029553 A1 | * | 8/2000 |
| JP | 10-166712 | | 6/1998 |
| JP | 2004-169032 | | 6/2004 |
| JP | 2004-230636 | | 8/2004 |
| JP | 2005288801 A | * | 10/2005 |
| WO | WO 2004035684 A2 | * | 4/2004 |

OTHER PUBLICATIONS

Computer-Generated English Translation of JP 2004-230636 dated Aug. 19, 2004.
Computer-Generated English Translation of JP 2004-169032 dated Jun. 17, 2004.
Computer-Generated English Translation of JP 10-166712 dated Jun. 23, 1998.

* cited by examiner

*Primary Examiner*—Matthew Luu
*Assistant Examiner*—Rut Patel
(74) *Attorney, Agent, or Firm*—Ladas and Parry LLP

(57) ABSTRACT

An inkjet recording method for producing a black image on a recording medium by using an ink set having two or more types of ink compositions including at least one black ink composition and at least one color ink composition, wherein the recording medium has a recording surface with a 20-degree specular gloss value as defined by JIS Z8741 of 10% or larger, and an image clarity value as defined by JIS K7105 of 15-95%; and wherein the discharged weight of the black ink composition upon producing the black image is 0-10 weight % in proportion to the total discharged weight (100 weight %) of the ink composition discharged upon producing the black image.

11 Claims, No Drawings

INKJET RECORDING METHOD AND RECORDED MATTER

BACKGROUND

1. Technical Field

The present invention relates to an inkjet recording method and recorded matter, and more particularly to an inkjet recording method capable of obtaining recorded matter having uniform glossiness, and recorded matter obtained with that method.

2. Related Art

Inkjet recording methods are printing methods in which printing is performed by making small ink droplets jet and adhere to a recording medium such as paper. Owing to the recent drastic developments in inkjet recording techniques, the inkjet recording methods are now used also for highly precise image recording (printing), which has until now been performed with photography or offset printing. Therefore, high quality recording is required not only for generally used plain paper and dedicated inkjet recoding paper (matte and gloss), but also for recording media such as printing paper.

An ink composition containing water, color material as colorant, water-soluble organic solvent, and surfactant, etc., is generally known as the ink used in the inkjet recording. Dye or pigment is used as the colorant. Particularly in a color ink, water-soluble dyes are often used because of their high color saturation, clarity, and water solubility, etc. However, lightfastness or gas fastness is generally insufficient in those dyes. The waterfastness of those dyes is also insufficient because of their water solubility, and therefore, matter recorded with an ink using water soluble dye has poor recorded image storage stability.

Meanwhile, water-insoluble colorant has better waterfastness. Among water-insoluble colorants, pigment is the color material having particularly excellent lightfastness, gas fastness, and waterfastness. Therefore, pigment inks utilizing those color material properties have been developed. For example, a water-based pigment ink in which pigment is dispersed with surfactant or high polymer dispersant, one using self-dispersing pigment obtained by adding a water dispersible functional group to the pigment surface, and one using coloring particles obtained by covering pigment with water dispersible resin, have been proposed.

Some of those pigment inks have pigment particles (including pigment-containing coloring particles) that are stably dispersed in an ink solution. However, during the process of the ink being dried after being attached to a recording medium such as paper, a structure in the ink changes with evaporation of water or volatile solvent, or because ink solvent is absorbed into an ink absorption layer in a recording medium. Therefore, a stable dispersion structure changes and the pigment is likely to aggregate on the recording medium surface. Accordingly, when recording media such as plain paper and matte paper are used, bright coloration can be obtained because the pigment remains on the recording medium surface. In general, the text quality of a black ink composition obtained on plain paper is often regarded as particularly important, and so the pigment concentration in the ink composition is high. Moreover, an ink composition using a self-dispersing pigment is advantageous in that the coloring ability on plain paper and the pigment concentration in the ink can be increased.

However, when a glossy media is used, concavity and convexity are formed on the media surface because of the pigment remaining on the recording medium, and diffused reflection occurs. For that reason, the glossiness in a portion the ink has been attached to is likely to be lost.

Particularly, when a color image is produced, the pigment amount on a recording medium becomes larger in portions where black ink overlaps with other color ink and the ink concentration becomes high. Compared with a single color image, concavity and convexity are more likely to form in those portions, and therefore, the glossiness is more likely to deteriorate and image uniformity is more likely to be lost (glossiness becoming uneven). Accordingly, the image becomes unnatural, and, as a result, the image quality is lowered.

To solve the above described problems, an inkjet recording method in which, when producing a black image, the amount of yellow and magenta ink used is reduced by using a special color ink such as red ink, and the pigment amount on a recording medium is thereby reduced has been proposed (JP-A-2004-230636).

Also, an ink composition in which uneven glossiness can be reduced with an inkjet ink set and image-recording element combination including: A) an inkjet image-recording element having a gloss value of at least 5 when measured at 60 degrees; B) a pigment based inkjet ink set having at least one pigment-based ink; wherein the normalized differential specular reflectance ($N\Delta R_S$ (x)) for each ink in the set is less than 1.25 when calculated according to a predetermined equation (JP-A-2004-169032).

Also, a recording method in which, when recording composite black by overprinting recording liquids of at least three colors, i.e. yellow, magenta, and cyan, the overprinting sequence of yellow, magenta, and cyan is changed according to the type of recording medium or color tone of the recording liquids, thereby realizing a composite black closer to real black, has been proposed (JP-A-10-166712).

However, in the method using a special color ink such as red ink, the number of ink colors increases and the cost increases accordingly, compared to methods using general YMC inks. The method of reducing uneven glossiness with the inkjet ink set and image-recording element combination lacks versatility. In the method changing the overprinting sequence of yellow, magenta, and cyan, plain paper or coated paper is used as a recording medium. However, the application of that method to a glossy media has not been examined.

SUMMARY

An advantage of the invention is the provision of an inkjet recording method capable of obtaining excellent coloring ability, glossiness, and rubbing resistance on a glossy recording medium, and recorded matter obtained with that inkjet recording method.

The present invention has achieved the above stated advantage by providing the invention of (1): an inkjet recording method for producing a black image on a recording medium by using an ink set having two or more types of ink compositions including at least one black ink composition and at least one color ink composition, wherein the recording medium has a recording surface with a 20-degree specular gloss value as defined by JIS Z8741 of 10% or larger and an image clarity value as defined by JIS K7105 of 15-95%; and wherein the discharged weight of the black ink composition upon producing the black image is 0-10 weight % in proportion to the total discharged weight (100 weight %) of the ink composition discharged upon producing the black image.

A preferred embodiment of the invention is as follows. (2): In the inkjet recording method according to (1) above, the black ink composition contains at least self-dispersing pigment as colorant, and the color ink composition contains at least organic pigment covered with water-insoluble polymer as colorant.

(3): In the inkjet recording method according to (1) or (2) above, the color ink compositions are, at the least, a yellow ink composition, magenta ink composition, and cyan ink composition.

(4): In the inkjet recording method according to (2) above, the content of self-dispersing pigment in the black ink composition is 4-10 weight % in proportion to the total weight (100 weight %) of the black ink composition.

(5): In the inkjet recording method according to any of (1) to (4) above, the content of the organic pigment in the color ink composition is 3-8 weight % in proportion to the total weight (100 weight %) of the color ink composition.

(6): Recorded matter recorded with the inkjet recording method according to (1) to (5) above.

DESCRIPTION OF EXEMPLARY EMBODIMENTS

Inkjet Recording Method An inkjet recording method according to the present invention will be described according to its preferable embodiments. As described above, the inkjet recording method according to the present invention is one for producing a black image on a recording medium by using an ink set having two types of ink compositions including at least a black ink composition and a color ink composition. In that inkjet method, the recording medium has a recording surface in which the 20-degree specular gloss value as defined by JIS Z8741 is 10% or larger, and the image clarity value as defined by JIS K7105 is 15-95%. The discharge weight of the black ink composition when producing the black image is 0-10% in proportion to the total discharge weight (100 weight %) of ink discharged when producing the black image.

The recording medium used in the embodiments has a recording surface in which the 20-degree specular gloss value as defined by JIS Z8741 is 10% or larger, preferably 15% or larger, in terms of the recording medium glossiness.

The "specular gloss" is the amount of specular reflection of light applied to the recording medium surface. JIS defines 100% specular gloss value as 10% reflectance of light at a 60 degree incidence angle relative to a glass surface having a 1.567 refractive index. Accordingly, the "20-degree specular gloss value" is a reflectance in proportion to 5% reflectance (100%) at a 20 degree incidence angle relative to a recording medium having a 1.567 refractive index.

Incidentally, if the 20-degree specular gloss value is less than 10%, the glossiness in the recording medium becomes poor.

Generally, a 60-degree gloss value in printed matter is used as an index of specular gloss. However, it has been found that even if a recording medium used in the present embodiment has a high 60-degree gloss value, that value does not coincide with perceived glossiness. As a result of examination of different viewing angles, it has also been found that the gloss value at a 20 degree view angle coincides with the perceived glossiness. Accordingly, the gloss value at the 20 degree view angle is used as an index value in the present embodiment.

The gloss value can be measured with a commercial glossiness measure. For example, the gloss value measure GM-268 (manufactured by Konica Minolta Sensing, Inc.) is available.

In terms of acquisition of clarity in an image recorded on a recording medium, a recording medium used in the present embodiment has a recording surface in which the image clarity value as defined by JIS K7105 is 5-95%, preferably 20 to 95%. The "image clarity value" in the present embodiment is the appearance of an object reflected on a paper surface. The image clarity value can be measured with an ICM-IDP image clarity measure (manufactured by Suga Test Instruments Co., Ltd.).

If the image clarity value is less than 15%, the clarity in a recorded image becomes poor. Meanwhile, if the image clarity value exceeds 95%, an object is reflected too much and the recorded portion becomes hard to see.

In the present embodiment, a black image is produced on a recording medium having the above described gloss value and image clarity through composite treatment by using an ink set having two types of ink compositions including at least a black ink composition and a color ink composition. Here, from the viewpoint of acquisition of uniform glossiness in an obtained image, the discharge weight of the black ink composition is preferably 0-10 weight % in proportion to the total discharge weight (100 weight %) of the ink discharged when producing the black image.

If the discharge weight of the black ink composition exceeds 10 weight %, the image uniformity deteriorates (uneven glossiness occurs), making the image unnatural.

The pigment used in the black ink composition preferably is carbon black. Examples of the carbon black include: #2300, #900, HCF88, #33, #40, #45, #52, MA7, MA8, MA100, #2200B, and so on, manufactured by Mitsubishi Chemical Corporation; Raven 5750, Raven 5250, Raven 5000, Raven 3500, Raven 1255, and Raven 700 manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation; and Color Black FW1, Color Black FW2V, Color Black FW18, Color Black FW 200, Color Black S150, Color Black S160, Color Black S170, Printex 35, Printex U, Printex V, Printex 140U, Special Black 6, Special Black 5, Special Black 4A, Special Black 4, and so on, manufactured by Degussa Corporation. Each can either be used alone, or a combination of them can be used together.

From a coloring ability (concentration) point of view, the black ink composition used preferably contains at least self-dispersing pigment as color material.

The "self-dispersing pigment" is a pigment obtained by bonding the pigment surface with a number of hydrophilic function groups and/or salts thereof (hereinafter referred to as "dispersibility-imparting groups") directly, or indirectly via an alkyl group, alkyl ether group, or aryl group, etc., and can be dispersed/dissolved in an aqueous vehicle without dispersant. "[Being] dispersed/dissolved in an aqueous vehicle without dispersant" means the state where pigment particles of the smallest diameter capable of being dispersed in an aqueous vehicle without dispersant for dispersing the pigment stably exist. The "pigment particles of the smallest diameter capable of being dispersed" indicate a pigment particle diameter that cannot be made any smaller even if the dispersal time is extended.

The ink containing the self-dispersing pigment as colorant does not need to contain the dispersant mentioned above, which is usually contained for the purpose of dispersing pigment, and in an ink with no dispersant, foam formation caused by dispersant hardly occurs, and an ink with good discharge stability can be easily manufactured. Moreover, because a drastic increase in viscosity caused by dispersant can be prevented, an ink can contain a greater amount of pigment. Accordingly, printing density can be sufficiently raised, and so the ink's handling becomes easier.

The self-dispersing pigment is manufactured by bonding (grafting) the pigment surface with a dispersibility-imparting group, such as —COOH, —CO, —OH, —SO$_3$H, —PO$_3$H$_2$ or quaternary ammonium or salts thereof, or a substituent having that dispersibility-imparting group, by performing physical or chemical treatment on the pigment. Examples of physical treatment include vacuum plasma treatment. Examples of chemical treatment include wet oxidation treatment, in which the pigment surface is oxidized with oxidant in water, and treatment in which a pigment surface is bonded with a carboxyl group via a phenyl group by bonding the pigment surface with p-aminobenzoate.

In the present embodiment, self-dispersing pigment subjected to surface treatment based on oxidization treatment with hypohalous acid and/or hypohalous acid salt or oxidization treatment with ozone is preferably used, in terms of high coloration.

The self-dispersing pigment may also be a commercial one. Examples include Microjet CW-1 (product name; manufactured by Orient Chemical Industries, Ltd.), CAB-O-JET200, CAB-O-JET300 (product names; manufactured by Cabot Corporation), and similar.

The content of the self-dispersing pigment in the black ink composition preferably is 4-10 weight % in proportion to the total weight (100 weight %) of the black ink composition. If the content is less than 4 weight %, the printing density (OD value) is insufficient in some cases. Meanwhile, if the content is more than 10 weight %, nozzle clogging or discharge instability may occur, decreasing the ink reliability.

From the viewpoint of acquisition of higher OD value and further increase in glossiness, the self-dispersing pigment preferably has 50-250 nm volume mean particle size. That volume mean particle size can be measured using a Microtrac UPA150 (manufactured by Microtrac Inc.) or a LPA3100 particle distribution measure (manufactured by Otsuka Electronics Co., Ltd.).

From the point of view of waterfastness, weather fastness, and pigment dispersal stability, etc, the color ink composition used in the present embodiment preferably contains at least organic pigment covered with water-insoluble polymer as color material.

The water-insoluble polymer is a polymer obtained by polymerizing, by solution polymerization, at least a polymerizable unsaturated monomer and polymerization initiator. The water-insoluble polymer is a polymer with 1 g or less solubility in 100 g water at 25° C. after neutralization.

Examples of the polymerizbale unsaturated monomers include: vinyl aromatic hydrocarbon, methacrylic acid esters, methacrylic amide, alkyl substitution methacrylic amide, maleic anhydride, vinyl cyanogen compounds, methyl vinyl ketone, and vinyl acetate. More specific examples include: styrene, α-methylstyrene, vinyl toluene, 4-t-butylsyrene, chlorstyrene, vinyl anisole, vinyl naphthalene, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, acrylonitrile, and methacrylonitrile, etc. These may either be used alone, or a combination of two or more types can be used together.

The water-insoluble polymer, which imparts glossiness to a printed image, preferably includes monomers each having a hydrophilic base and salt-forming group.

Examples of the monomers having a hydrophilic base include: polyethylene glycol monometacrylate, polypropylene glycol monometacrylate, and ethylene glycol propylene glycol monometacrylate, etc. They may either be used alone, or a combination of two or more types can be used together. In particular, glossiness in a printed image can be further improved by using a monomer component that forms a branched chain, such as polyethylene glycol (2-30) monometacrylate, polyethylene glycol (1-15) propylene glycol (1-15) monometacrylate, polypropylene glycol (2-30) methacrylate, methoxyporyethylene glycol (2-30) methacrylate, methoxypolytetramethylene glycol (2-30) methacrylate, and methoxy (ethylene glycol propylene glycol copolymer) (1-30) methacrylate, etc.

Examples of monomers having a salt-forming group include: acryl acid, methacryl acid, styrene carboxylic acid, and maleic acid, etc. These may either be used alone, or a combination of two or more types can be used together.

Macromonomers having a polymerizing functional group at one terminal, such as styrene macromonomers or silicone-series macromomoners, or other types of monomers can also be included.

When polymerization is performed, a known radical polymerization agent or polymerization chain transfer agent may also be added. The organic pigment covered with water-insoluble polymer is obtained with a phase-inversion emulsification method. In other words, the water-insoluble polymer is dissolved into an organic solvent, such as methanol, ethanol, isopropanol, n-butanol, acetone, methylethyl ketone, or dibutyl ethel, etc; organic pigment is added to the above obtained solution; an oil-in-water-type dispersion is prepared by adding a neutralization agent and water to the above obtained solution, mixing it, and performing dispersion treatment thereon; and the organic pigment covered with water-insoluble polymer can be obtained as a water dispersion by removing the organic solvent from the above obtained dispersion element. The mixing and dispersion treatment can be performed by using, for example, a ball mill, roll mill, bead mill, high-pressure homogenizer, or high-speed stirring disperser, etc.

The neutralization agent preferably is a tertiary amine such as ethylamine or trimethylamine, lithium hydroxide, potassium hydroxide, or ammonia, etc. The acquired water dispersion preferably has a pH of 6-10.

From the point of view of stable dispersion of colorant, particularly pigment, the water-insoluble polymer that covers the pigment preferably has 10000-150000 weight average molecular weight. The weight average molecular weight can be measured with a molecular weight analysis method using gel permeation chromatography (GPC).

In terms of coloring ability and glossiness on a glossy medium, the mean particle size in the ink composition is preferably within the range of 50-150 nm. The mean particle size can be measured using a Microtrac UPA150 (manufactured by Microtrac Inc.) or an LPA 3100 particle size distribution measure (manufactured by Otsuka Electronics Co., Ltd.).

The organic pigment covered with water-insoluble polymer may be not completely covered with the water-insoluble polymers, partially exposing the colorant.

The color ink compositions used in the present embodiment are preferably, at the least, a yellow ink composition, magenta ink composition, and cyan ink composition. Examples of the pigments in the color ink composition include pigment yellow, pigment red, pigment violet, and pigment blue, etc., listed in the color index. More specifically, C.I. pigment yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 147, 150, 153, 155, 174, 180, 188, 198; C.I.

pigment red 1, 3, 5, 8, 9, 16, 17, 19, 22, 38, 57:1, 90, 112, 122, 123, 127, 146, 184, 202, 207, 209; C.I. pigment violet 1, 3, 5:1, 16, 19, 23, 38; C.I. pigment blue 1, 2, 15, 15:1, 15:2, 15:3, 15:4, 16; and C.I. pigment black 1, and 7, etc. are used. A plurality of pigments from among them may be used to form the ink composition.

In particular, the organic pigment contained in the yellow ink composition preferably includes at least one selected from C.I. pigment yellow 74, 109, 110, 128, 138, 147, 150, 155, 180, and 188. The organic pigment contained in the magenta ink composition preferably includes at least one selected from C.I. pigment red 122, 202, 207, and 209 and pigment violet 19. The organic pigment contained in the cyan ink composition preferably includes at least one selected from C.I. pigment blue 15, 15:1, 15:2, 15:3, 15:4, and 16.

Alternatively, any water-insoluble pigment, including those not listed in the color index, may be used.

The content of the organic pigment covered with those water-insoluble polymers is preferably 3-8 weight % in proportion to the total weight (100 weight %) of the color ink composition. If the content is less than 3 weight %, the printing density (coloring ability) is insufficient in some cases. Meanwhile, if the content exceeds 8 weight %, glossiness reduction on a glossy medium, nozzle clogging, or discharge instability may occur, decreasing the ink reliability.

From the point of view of prevention of dispersion stability, ink storage stability, and nozzle clogging, and glossiness on a glossy medium, The ratio of the organic pigment to the water-insoluble polymer is preferably between 1:0.2 to 1:1. If the ratio of the water-insoluble polymers to the organic pigment is less than 20%, the pigment cannot be stably dispersed and the organic pigment aggregates. Meanwhile, if the ratio of the water-insoluble polymers to the organic pigment exceeds 100%, bronzing is reduced, but coloring ability decreases and the glossiness on a glossy medium deteriorates.

The black ink composition and color ink composition used in the present embodiment preferably contain resin emulsion for the purpose of increased rubbing resistance, in terms of fixation and gloss change.

As the resin emulsion, it is preferable to use one or more selected from the group consisting of acrylic resin, methacrylic resin, styrene resin, urethane resin, acrylamide resin, and epoxy resin. Those resins may be used as either homopolymers or copolymers. Resins of either single or multiple structure (core-shell type, etc.) may be used.

Furthermore, the resin emulsion consists resin obtained by polymerizable unsaturated monomers. The unsaturated monomers may be acrylic acid ester monomers, methacryl acid ester monomers, aromatic vinyl monomers, vinyl ester monomers, vinyl cyanogen compound monomers, halogenoid monomers, olefin monomers, or diene monomers, etc. More specific examples of the unsaturated monomers include: acryl acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrelate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, polyethylene glycol monomethacrylate, polypropylene glycol monometacrylate, and ethylene glycol propylene glycol monometachrylate; vinyl esters such as vinyl acetate; vinyl cyanogen compounds such as acylonitrile and methacrylonitrile; halogenoid monomers such as vinylidene chloride and vinyl chloride; aromatic vinyl monomers such as styrene, α-methylstyrene, vinyl toluene, 4-t-butylstyrene, chlorstyrene, vinylanisole, and vinyl naphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, maleic acid, and stylene carboxylic acid; acrylamides such as acrylamide, methacrylamide, and N,N'-dimethylacrylamide; hydroxyl-containing monomers such as 2-hydroxyethyl acrylate, 2-hydroxypropyl acrylate, 2-hydroxyethyl methacrylate, and 2-hydroxypropyl methacrylate; styrene macromonomer; and silicone macromonomer, etc. The unsaturated monomers can either be used alone, or a combination of two or more can be used together.

A cross-linking monomer having two or more polymerizable double links can also be used.

The resin is obtained by copolymerizing monomers using a known polymerization method such as bulk polymerization, solution polymerization, suspension polymerization, or emulsion polymerization. A polymerization initiator, polymerization chain transfer agent, or surfactant may be added. A neutralization agent may also be used in the usual manner. In particular, it is preferable to use ammonia or inorganic alkali hydroxide such as sodium hydroxide or potassium hydroxide as the neutralization agent.

From the viewpoint of efficient acquisition of appropriate inkjet property values, reliability (in terms of nozzle clogging and discharge stability, etc.), fixation, and glossiness, the resin emulsion content in the ink composition is preferably in the range of 0.1-10 weight %. The volume mean particle size of the resin emulsion is preferably 20-200 nm.

The black ink composition and the color ink composition preferably contain at least water, a water soluble organic compound, pH adjuster, and nonionic surfactant.

The water contained in the ink composition used in the present embodiment is the main solvent, and is preferably purified water or ultrapure water such as ion-exchange water, ultrafiltrate, reverse-osmosis water, or distilled water, etc. In particular, it is preferable to use water subjected to sterilization treatment using ultraviolet exposure or hydrogen peroxide addition, so that fungus and bacteria generation can be prevented, enabling the ink composition to be stored for quite a while.

Examples of the water soluble organic compounds in the present embodiment include: polyalcohols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, 1,5-pentanediol, and 4-methyl-1,2-pentanediol; sugars such as glucose, mannose, fructose, ribose, xylose, arabinose, galactose, aldonic acid, glucitol, (sorbit), maltose, cellobiose, lactose, sucrose, trehalose, and maltotriose; sugar alcohols; hyaluronic acids; so-called solid humectants such as trimethylolethane, trimethylolpropane, urea, and urea derivative; $C^{1-4}$ alkyl alcohols such as ethanol, methanol, butanol, propanol, and isopropanol; glycol ethers (butyl glycols) such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propylether, ethylene glycol mono-isopropyl ether, diethylene glycol mono-iso-propylether, ethylene glycol mono-n-butyl ether, ethylene glycol mono-t-butyl ether, diethyl glycol mono-t-butyl ether, triethylene glycol monobutyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrolidon, N-methyl-2-pyrolidon; 1,3-dimethyl-2-imidazolidinone; formamide, acetamide; dimethyl sulfoxide; sorbit; sorbitan; acetin; diacetin; triacetin; and sulfolane. Those water soluble organic compounds may either be used alone, or two or more of them may be used together. The content of the water soluble organic compounds in the ink composition is preferably 10 to 50 weight %, for the purpose of maintaining appropriate ink composition property values (viscosity, etc.), printing quality, and reliability.

Moreover, in the ink compositions used in the present embodiment, at least polyalcohols, solid humectant, and butyl ethers of glycol ether are used together as the water soluble organic solvent, so that ink compositions having good reliability, in terms of printing quality, discharge stability, clogging recoverability, can be provided. The polyalcohols and solid humectant are suitable for control of the water retention (moisture retention) and permeability of the ink compositions into a recording medium such as plain paper, and butyl ethers of glycol ether are suitable for control of the discharge stability and permeability of the ink compositions into a recording medium. By using them together, ink compositions with better reliability, such as printing quality, discharge stability, and nozzle-block recoverability, can be provided.

More preferably, the water soluble organic compounds may be: a polyalcohol that is combination of two or more types selected from glycerin, diethylene glycol, triethylene glycol, 1,5-pentanediol, and 1,2-hexanediol; a solid humectant that is trimethylol ethan, trimethylol propane, or urea; and a butyl glycol that is diethylene glycol monobutyl ether or triethylene glycol monobutyl ether.

The ink compositions used in the present embodiment preferably contain a pH adjuster. The pH adjuster may be alkali hydroxide such as lithium hydroxide, potassium hydroxide, and sodium hydroxide, and/or alkanolamine such as ammonia, triethanolamine, tripropanolamine, diethanolamine, and monoethanolamine. Particularly, at least one type of pH adjuster selected from alkali metal hydroxide, ammonia, triethanolamine, and tripropanolamine is preferably contained, and the ink composition is preferably adjusted to pH 6-10. If the pH value is out of that range, the components of an inkjet printer are negatively affected, or the nozzle clogging recoverability deteriorates.

If necessary, collidine, imidazole, phosphoric acid, 3-(N-morpholino)propanesulfonic acid, tris-(hydroxymethyl)aminomethane, or boric acid may be used as a pH buffer.

Trialkanolamine added to the ink compositions can be used also as a glossiness imparting agent as desired, and is contained in the yellow, magenta, and cyan ink compositions to produce an image having uniform glossiness on a glossy recording medium.

If trialkanolamine is used as a gloss imparting agent in the ink compositions, from the viewpoint of its degradation into components of a printer, and ink viscosity and glossiness, the trialkanolamine content is preferably 10-50 weight %, more preferably 12-45 weight % in proportion to the 100 weight % of the pigment. The trialkanolamine content in the total ink compositions is preferably 1 weight % or more, more preferably in the range of 1-3 weight %.

Although the trialkanolamine used as a gloss imparting agent in the ink compositions is not limited to a specific type, from the viewpoint of improvement in printing stability and glossiness, triethanolamine and/or tripropanolamine is preferably used.

If necessary, a surfactant, defoaming agent, antioxidant, ultraviolet absorber, antiseptic and antifungal agents, etc., may be added in the ink compositions used in the present embodiment.

Examples of the surfactants include anionic surfactants, cationic surfactants, ampholytic surfactants, and nonionic surfactants. It is particularly preferable to use a nonionic surfactant for the purpose of acquiring ink compositions with less foam formation.

More specific examples of the nonionic surfactants include: ethers such as an acetylene glycol surfactant, acetylene alcohol surfactant, polyoxyethylene nonyl phenyl ether, polyoxyethylene octyl phenyl ether, polyoxyethylene dodecyl phenyl ether, polyoxyethylene alkyl aryl ether, polyoxyethylene oleyl ether, polyoxyethylene lauryl ether, polyoxyethylene alkyl ether, and polyoxyalkylene alkyl ether; esters such as polyoxyethylene oleic acid, polyoxyethylene oleic acid ester, polyoxyethylene distearate ester, sorbitan laurate, sorbitan monostearate, sorbitan monooleate, sorbitan sesquioleate, polyoxyethylene monooleate, and polyoxyethylene stearate; polyether modified siloxane surfactants such as dimethyl polysiloxane; and fluorine-containing surfactants such as fluorine alkyl ester and perfluoroalkyl carbonic acid. These nonionic surfactants may either be used alone, or a combination of two or more types may be used together.

Among those nonionic surfactants, acetylene glycol surfactant and/or polyether modified siloxane surfactant is preferably used, because they exhibit less foam formation and excellent antifoaming property.

More specific examples of acetylene glycol surfactants include: 2,4,7,9-tetramethyl-5-decine-4,7-diol, 3,6-dimethyl-4-octine-3,6-diol, and 3,5-dimethyl-1-hexine-3-ol. Commercial products, such as Surfynol 104, 82, 465, and 485, and TG manufactured by Air Products and Chemicals, Inc.; and Olfine STG and Olfine E1010 manufactured by Nisshin Chemical Industry Co., Ltd., etc., are also available. More specific examples of polyether modified siloxane surfactants include BYK-345, BYK-346, BYK-347, BYK-348, and UV3530 manufactured by BYC-Chemie Japan. A plurality of them may be used in the ink compositions. The surfactant surface tension is preferably adjusted to 20-40 mN/m, and the content in each ink composition is 0.1-3.0 weight %.

Examples of antioxidants and ultraviolet absorbers include: allophanates such as allophanate and methyl allophanate; biurets such as biuret, dimethyl biuret and tetramethyl biuret; L-ascorbic acid and its salts; Tinuvin 328, 900, 1130, 384, 292, 123, 144, 622, and 770; Irgacor 252 and 153; Irganox 1010, 1076, and 1035, and MD 1024 manufactured by Nihon Ciba-Geigy K.K.; and lanthanide oxides, etc.

Examples of antiseptic and antifungal agents include: sodium benzoate, sodium pentachlorophenol, 2-pyridinethiol-1-sodium oxide, sorbic acid sodium, sodium dehydroacetate, and 1,2-benzisothiazoline-3-one (Proxel CRT, Proxel BDN, Proxel GXL, Proxel XL-2, and Proxel TN manufactured by Avecia Limited).

The ink compositions used in the present embodiment can be prepared in the same manner as conventional ink by using known devices, such as a ball mill, sand mill, attritor, basket mill, or roll mill, etc. In the process of preparation, coarse particles are preferably removed to prevent nozzle clogging.

Coarse particles are removed by filtering the ink obtained from combining the above described constituents through a filter such as a membrane filter or mesh filter to remove preferably particles with a diameter of 10 μm or more, and more preferably those with a diameter of 5 μm or more.

As the inkjet recording method for producing a black image on a recording medium, a known inkjet recording method can be used. The "inkjet recording method" in the present embodiment means the method of discharging ink droplets of the ink compositions included in the ink set from minute nozzles and attaching the ink droplets to a recording medium, and will be described below more specifically.

The first inkjet recording method is an electrostatic suction type, in which recording is performed by applying an intense electric field between the nozzles and an acceleration electrode placed in front of the nozzles to sequentially discharge ink droplets from the nozzles, and providing a print information signal to deflection electrodes while the ink droplets are flying between the deflection electrodes, or by discharging ink droplets according to a print information signal without deflecting the ink droplets.

The second method is a type in which recording is performed by applying pressure to ink liquid with a small pump and mechanically vibrating nozzles with a crystal oscillator or the like to forcedly discharge ink droplets. The ink droplets are charged when they are discharged, and a print information signal is given to deflection electrodes while the ink droplets are flying between the deflection electrodes.

The third method is a type using piezoelectric devices in which ink droplets are discharged to perform recording by simultaneously applying pressure and giving a print information signal to the ink liquid.

The fourth method is a type in which ink volume is drastically expanded by the action of thermal energy. In this method, ink droplets are discharged to perform recording by using a microelectrode to heat the ink according to a print information signal, making it foam.

Any of the above described methods may be used as the inkjet recording method in the present embodiment.

Recorded Matter

The recorded matter in the present embodiment is obtained by performing recording on a recording medium by using at least the above described inkjet recording method. Such recorded matter exhibits excellent glossiness on glossy media because of the inkjet recording method in the present embodiment.

As described above, the recording medium used in the present embodiment has a 20-degree specular gloss value as defined by JIS Z8741 of 10% or larger, and an image clarity value as defined by JIS K7105 of 15-95%. Because the inkjet recording method has already been described above, its explanation is omitted here.

EXAMPLES

Preparation of Colorant Dispersant for Color Ink Compositions

Colorant dispersants having colorant covered with water-insoluble polymer as dispersed particles were prepared using the method described below.

Water-Insoluble Polymer Composition 20 parts by weight of organic solvent (methyl ethyl ketone), 0.03 parts by weight of polymerization chain transfer agent (2-mercaptoethanol), a polymerization initiator, and monomers shown in Table 1 were prepared in a reaction container in which sufficient nitrogen gas replacement had taken place, and polymerized while being stirred at 75° C. 0.9 parts by weight of 2,2'-azobis (2,4-dimethyl valeronitrile) dissolved in 40 parts by weight of methyl ethyl ketone was added to 100 parts by weight of monomer constituents and matured at 80° C. for an hour, obtaining desired water-insoluble polymers 1 and 2. The numeric values shown in Table 1 mean the proportion (weight %) of the respective monomer mixtures in the total amount (100 weight %) of monomer mixtures.

TABLE 1

| Relative Proportion in Monomer Mixture (weight %) | Water-insoluble Polymer 1 | Water-insoluble Polymer 2 |
|---|---|---|
| Methacryl Acid | 20 | 15 |
| Styrene Monomer | 45 | 30 |
| Benzyl Methacrylate | | 20 |
| Polyethylene Glycol Monomethacrylate (EO = 15) | 5 | 10 |
| Polypropylene Glycol Monomethacrylate (PO = 9) | | 10 |
| Polyethylene Glycol•Propylene Glycol Monomethacrylate (EO = 5, PO = 7) | 10 | |
| Styrene Macromonomer | 20 | 15 |

EO: Ethylene Oxide
PO: Propylene Oxide

Dispersed Solution Y1

5 parts by weight of the substance obtained by performing reduced-pressure drying on polymer obtained as water-insoluble polymer 1 was dissolved in 15 parts by weight of methyl ethyl ketone, and neutralized with aqueous sodium hydroxide. 15 parts by weight of C. I. Pigment Yellow 74 was also added, and the solution was mixed with a disperser while water was added.

After 100 parts by weight of ion-exchange water was added to the above obtained mixed matter and that mixed matter was stirred, methyl ethyl ketone was removed at 60° C. under reduced pressure, and some water was also removed, obtaining water dispersed yellow pigment with 20 weight % solid concentration.

Dispersed Solution Y2

9 parts by weight of the substance obtained by performing reduced-pressure drying on polymer solution obtained as water-insoluble polymer 2 was dissolved in 45 parts by weight of methyl ethyl ketone, and neutralized using aqueous sodium hydroxide. 18 parts by weight of C. I. Pigment Yellow 128 was also added, and mixed by a disperser while water was added.

After 120 parts by weight of ion-exchange water were added to the above obtained mixed matter and that mixed matter was stirred, methyl ethyl ketone was removed at 60° C. under reduced pressure, along with some water, resulting in a water dispersed yellow pigment with 20 weight % solid concentration.

Dispersed Solution M1

Dispersed solution M1 was obtained in the same manner as dispersed solution Y1, except that C. I. Pigment Red 122 was used instead of C. I. Pigment Yellow 74.

Dispersed Solution M2

Dispersed solution M2 was obtained in the same manner as dispersed solution Y2, except that C. I. Pigment Violet 19 was used instead of Pigment Yellow 128, and the weight ratio of pigment to water-insoluble polymer was changed to 1:0.2.

Dispersed Solution C1

Dispersed solution C1 was obtained in the same manner as pigment dispersed solution Y1, except that C. I. Pigment Blue 15:3 was used instead of C. I. Pigment Yellow 74.

Dispersed Solution C2

Dispersed solution C2 was obtained in the same manner as pigment dispersed water Y2, except that C. I. pigment blue 15:4 was used instead of C. I. Pigment Yellow 128, and the weight ratio of the pigment to water-insoluble polymer was changed to 1:1.

Preparation of Colorant Dispersant for Black Ink Composition

Colorant dispersants having self-dispersing pigment as dispersed particles were prepared in the manner described below.

Dispersed Solution B1

100 g of MA8 (product name; manufactured by Mitsubishi Chemical Corporation), which is commercial carbon black, was mixed into 500 g of water, and was ground by a ball mill having zirconia beads. 500 g of sodium hypochlorite (available chlorine concentration: 12%) was dripped into the resulting solution, and that solution was boiled for ten hours while being stirred, performing wet oxidation. The above obtained dispersed undiluted water was filtered with glass fiber paper GA-100 (product name; manufactured by Advantec Toyo Kaisya, Ltd.), and was cleansed with water. The thus obtained wet cake was re-dispersed into 5 kg of water, desalinated and purified with a reverse osmosis membrane until its conductivity was 2 mS/cm, and concentrated until the pigment concentration was 15 weight %, resulting in dispersed solution B1.

Dispersed Solution B2

20 g of S170 (product name; manufactured by Degussa Japan Co., Ltd.), which is commercial carbon black, was mixed into 500 g of water, and was dispersed with a domestic mixer for five minutes. The obtained liquid was prepared in a 3-liter glass container equipped with an stirrer and stirred by that stirrer, while ozone-containing gas of 8 weight % ozone concentration was introduced at 500 cc/minute. Here, an electrolysis-generating ozonizer, manufactured by Permelec Electrode Ltd., was used to generate ozone. The obtained dispersed undiluted solution was filtered with glass fiber filter paper GA-100 (product name; manufactured by Advantec Toyo Kaisya, Ltd.), 0.1 N potassium hydroxide solution was added until the pigment concentration became 15 weight %, and the resulting solution was concentrated while its pH was adjusted to 9, resulting in dispersed solution B2.

Preparation of Resin Emulsion

Resin emulsion used in the color ink composition and black ink composition was prepared in the manner described below.

Resin Emulsion 1

1000 g of ion-exchange water and 6.5 g of sodium lauryl sulfate were prepared into a reaction container equipped with an stirrer, reflux condenser, dropper, and thermometer, and were heated to 70° C. while being stirred together with nitrogen replacement. The inner temperature was kept at 70° C., and 4 g of potassium peroxide was added as a polymerization initiator. After that dissolved, an emulsified product prepared in advance by adding, while being stirred, 20 g of acrylamide, 550 g of styrene, 200 g of butyl acrylate, 30 g of methacrylic acid, and 1 g of triethylene glycol diacrylate to 450 g of ion-exchange water and 2 g of sodium lauryl sulfate was continuously dripped into the reaction solution for four hours. After the dripping, the solution was matured for three hours.

After the thus obtained aqueous emulsion was cooled down to normal temperature, ion-exchange water and ammonia water were added, and its solid matter content and pH were adjusted respectively to 37 weight % and 8.

Resin Emulsion 2

900 g of ion-exchange water and 3 g sodium lauryl sulfate were prepared in a reaction container equipped with an stirrer, reflux condenser, dropper, and thermometer, and were heated to 70° C. while being stirred together with nitrogen replacement. The inner temperature was kept at 70° C., and 4 g of potassium peroxide was added thereto as a polymerization initiator. After that dissolved, an emulsified product prepared in advance by adding, while being stirred, 20 g of acrylamide, 300 g of styrene, 640 g of butyl acrylate, and 30 g of methacrylic acid to 450 g of ion-exchange water, and 3 g of sodium lauryl sulfate was continuously dripped into the reaction container for four hours. After the dripping, the solution was matured for three hours. After the thus obtained aqueous emulsion was cooled down to normal temperature, ion-exchange water and 5% sodium hydroxide were added, and its solid matter content and pH were adjusted respectively to 40 weight % and 8.

Preparation of Ink Compositions

Constituents were mixed in the proportions shown in Table 2. The mixed liquid, after being stirred for two hours, was filtered with a stainless filter with an approximate 5 μm hole diameter to prepare the ink compositions. Amounts added are shown by weight % in Table 2. The amounts of pigment dispersed liquid and polymer shown in the table are solid matter content. In addition, ion-exchange water is described as "Bal." which means that ion-exchange water was added to each ink composition to constitute the balance of the ink composition, i.e., the total amount less the amounts of the other components.

TABLE 2

| Ink structure | Ink composition | | | | | | | |
|---|---|---|---|---|---|---|---|---|
| | Ink Y1 | Ink Y2 | Ink M1 | Ink M2 | Ink C1 | Ink C2 | Ink B1 | Ink B2 |
| Dispersed Solution Y1 | 7.5 | | | | | | | |
| Dispersed Solution Y2 | | 5.6 | | | | | | |
| Dispersed Solution M1 | | | 4 | | | | | |
| Dispersed Solution M2 | | | | 5.3 | | | | |
| Dispersed Solution C1 | | | | | 3 | | | |
| Dispersed Solution C2 | | | | | | 4 | | |
| Dispersed Solution B1 | | | | | | | 8 | |
| Dispersed Solution B2 | | | | | | | | 4 |
| Resin Emulsion 1 | | 2 | | | | | | 2 |
| Resin Emulsion 2 | | | | 0.5 | | 2 | 4 | 2 |

TABLE 2-continued

| Ink structure | Ink composition | | | | | | | |
|---|---|---|---|---|---|---|---|---|
| | Ink Y1 | Ink Y2 | Ink M1 | Ink M2 | Ink C1 | Ink C2 | Ink B1 | Ink B2 |
| Glycerin | 10 | 10 | 10 | 10 | 10 | 10 | 15 | 10 |
| Triethylene Glycol | 5 | 5 | 6 | 4 | 7 | 5 | | 5 |
| 1,2-Hexanediol | 1 | 1 | 1 | 1 | 1 | 1 | 2 | 2 |
| Trimethylol Propane | 2 | 4 | 2 | 2 | 2 | 4 | | |
| Urea | | | | | | | 3 | |
| TEGmBE | 2 | 2 | 2 | 2 | 2 | 2 | 2 | 2 |
| 2-Pyrolidon | 1 | 1 | 1 | 1 | 1 | 1 | 3 | 3 |
| Olfine E1010 | 1 | 1 | 1 | 1 | 0.5 | 0.5 | 1 | 1 |
| Surfynol 104 | 0.5 | 0.5 | 0.5 | 0.5 | 0.5 | 0.3 | 0.1 | 0.1 |
| Triethanolamine | 1 | 1 | | 1 | | 1 | 1 | |
| Potassium Hydroxide | | | | | | | | 0.05 |
| EDTA | 0.02 | 0.02 | 0.02 | 0.02 | 0.02 | 0.02 | 0.02 | 0.02 |
| Proxel XL2 | 0.3 | 0.3 | 0.3 | 0.3 | 0.3 | 0.3 | 0.3 | 0.3 |
| Ion-Exchange Water | Bal. | Bal. | Bal. | Bal. | Bal. | Bal. | Bal. | Bal. |

TEGmBE: Triethylene Glycol Mono Butyl Ether
EDTA: Disodium Ethylene Diamine Tetraacetate Preparation of Recorded Matter 100%, 90%, and 80% black patches were prepared using Microsoft (Registered Trademark) Word, which is word processing software, and those patches were printed on each of the recording mediums shown in Table 3 by using a PX-A550 inkjet printer (manufactured by Seiko Epson Corporation).

Table 3 also shows 20-degree specular gloss values (referred to as "20° gloss" in the table) and image clarity values of the recording mediums 1) to 11) before printing.

TABLE 3

| | Recording Medium | 20° Gloss | Image Clarity |
|---|---|---|---|
| 1) | EPSON Photo Paper <Glossy> (Manufactured by Seiko Epson Corporation) | 18 | 58 |
| 2) | EPSON Glossy Paper (Manufactured by Seiko Epson Corporation) | 14 | 15 |
| 3) | EPSON Photo Glossy Paper (Manufactured by Seiko Epson Corporation) | 16 | 18 |
| 4) | Professional Photo Paper (Manufactured by Canon Inc.) | 36 | 75 |
| 5) | Super Photo Paper SP101 (Manufactured by Canon Inc.) | 23 | 77 |
| 6) | Economy Photo Paper EC101 (Manufactured by Canon Inc.) | 40 | 44 |
| 7) | Photolike QP Glossy-Thin (Manufactured by Konica Minolta Sensing, Inc.) | 14 | 40 |
| 8) | Gasai Glossy Finish (Manufactured by Fuji Photo Film Co., Ltd.) | 23 | 47 |
| 9) | Premium Plus Photo Paper (Manufactured by Hewlett-Packard Japan, Ltd.) | 75 | 43 |
| 10) | EPSON Photo Paper <Matte> (Manufactured by Seiko Epson Corporation) | 4 | 10 |
| 11) | Photolike QP Glossy-Thick (Manufactured by Konica Minolta Sensing, Inc.) | 8 | 22 |

Table 4 shows the ink set structure and usage ratios (%) of the ink compositions used when printing was performed on each recording medium shown in Table 3. In Table 4, each ink composition name corresponds to the same ink composition shown in Table 2. "0" means that the relevant ink composition was included in the ink set structure, but was not discharged when the black patches were formed.

TABLE 4

| Ink Set | Ink Compositions | | | | | | | |
|---|---|---|---|---|---|---|---|---|
| | Ink Y1 | Ink Y2 | Ink M1 | Ink M2 | Ink C1 | Ink C2 | Ink B1 | Ink B2 |
| 1 | 15 | — | 45 | — | 40 | — | 0 | — |
| 2 | — | 20 | — | 40 | 35 | — | 5 | — |
| 3 | — | 25 | — | 40 | — | 35 | — | 0 |
| 4 | 30 | — | 30 | — | — | 30 | — | 10 |
| 5 | 15 | — | 40 | — | 33 | — | 12 | — |
| 6 | — | 25 | — | 30 | — | 30 | — | 15 |

Table 5 shows the combination of ink sets and recording mediums used in recorded matter obtained as examples according to the present invention and comparative examples of the recording method. Hereinafter, the recorded matter obtained as examples according to the present invention and comparative examples of the recording method are referred to respectively as "example recorded matter" and "comparative example recorded matter."

TABLE 5

| Ink Set | Recording Medium | | | | | | | | | | |
|---|---|---|---|---|---|---|---|---|---|---|---|
| | 1) | 2) | 3) | 4) | 5) | 6) | 7) | 8) | 9) | 10) | 11) |
| 1 | Example 1-1 | Example 1-2 | Example 1-3 | Example 1-4 | Example 1-5 | Example 1-6 | Example 1-7 | Example 1-8 | Example 1-9 | Comparative Example 1-10 | Comparative Example 1-11 |
| 2 | Example 2-1 | Example 2-2 | Example 2-3 | Example 2-4 | Example 2-5 | Example 2-6 | Example 2-7 | Example 2-8 | Example 2-9 | Comparative Example 2-10 | Comparative Example 2-11 |

TABLE 5-continued

| Ink Set | 1) | 2) | 3) | 4) | 5) | 6) | 7) | 8) | 9) | 10) | 11) |
|---|---|---|---|---|---|---|---|---|---|---|---|
| 3 | Example 3-1 | Example 3-2 | Example 3-3 | Example 3-4 | Example 3-5 | Example 3-6 | Example 3-7 | Example 3-8 | Example 3-9 | Comparative Example 3-10 | Comparative Example 3-11 |
| 4 | Example 4-1 | Example 4-2 | Example 4-3 | Example 4-4 | Example 4-5 | Example 4-6 | Example 4-7 | Example 4-8 | Example 4-9 | Comparative Example 4-10 | Comparative Example 4-11 |
| 5 | Example 5-1 | Example 5-2 | Example 5-3 | Example 5-4 | Example 5-5 | Example 5-6 | Example 5-7 | Example 5-8 | Example 5-9 | Comparative Example 5-10 | Comparative Example 5-11 |
| 6 | Comparative Example 6-10 | Comparative Example 6-10 | Comparative Example 6-10 | Comparative Example 6-10 | Comparative Example 6-10 | Comparative Example 6-10 | Comparative Example 6-10 | Comparative Example 6-10 | Comparative Example 6-10 | Comparative Example 6-10 | Comparative Example 6-11 |

Test Example 1

Evaluation of 20-Degree Specular Gloss Value

The 20-degree specular gloss value (referred to as "20° gloss" in the table) of samples of the example and comparative example recorded matter shown in Table 5, was measured with a GM-268 specular gloss value measure (manufactured by Konica Minolta Sensing, Inc.). Measurement was performed five times on each sample, and the mean value of the results was calculated. The 20-degree specular gloss value ($G_{20}$) was evaluated for the calculated mean values based on the following criteria. Tables 6 to 11 show the results. Criteria: A: $60 \leq G_{20}$ B: $45 \leq G_{20} < 60$ C: $G_{20} < 45$ Test Example 2

Evaluation of Image Clarity

The image clarity of the sample of the example and comparative example recorded matter shown in Table 5, was measured. Measurement was performed by using an ICM-IDP image clarity measure (manufactured by Suga Test Instruments Co., Ltd.) at 45° reflection and 2 mm optical comb width. Measurement was performed five times on each sample, and the mean value of the measurement results was calculated. The image clarity for the calculated mean values was evaluated based on the following criteria. Tables 6 to 11 show the results. Criteria: A: $20 \leq G_{20}$ B: $10 \leq G_{20} < 20$ C: $G_{20} < 10$ Test Example 3

Evaluation of Glossiness

The glossiness of samples of the example and comparative example recorded matter shown in Table 5, was evaluated based on the following criteria. Tables 6 to 11 show the results. Criteria: A: Well glossy B: Less glossy C: Not glossy Test Example 4

Optical Density (OD Value) Measurement

The Optical density (OD value) in a "100% patch" portion of samples of the example and comparative example recorded matter shown in Table 5, was measured by using a Gretag density measure (manufactured by Gretag Macbeth AG). Measurement was performed five times on each sample, and mean values for the measurement results were calculated. The Optical density (OD value) for the calculated mean OD values was evaluated based on the following criteria. Tables 6 to 11 show the results. Criteria: A: $1.8 \leq$ Mean OD value B: $1.5 \leq$ Mean OD value $< 1.8$ C: Mean OD value $< 1.5$ Test Example 5

Fixation Evaluation

Fixation of samples of the example and comparative example recorded matter shown in Table 5 was evaluated. Measurement of the fixation was performed on each sample by marking a printed portion with a ZEBRA PEN 2 (Trademark) water-based yellow highlighter pen, manufactured by ZEBRA Co., Ltd., at 300 g/15 mm pen pressure after a lapse of an hour after printing, and visually observing the stain on the pen tip. The fixation was evaluated based on the following criteria. Tables 6 to 11 show the results. Criteria: A: No stain even after two markings B: No stain after one marking, but stain after two markings C: Stain after one marking.

Test Example 6

Evaluation of Gloss Change

Evaluation of gloss change on samples of the example and comparative example recorded matters shown in Table 5, was evaluated. Gloss change evaluation was performed by lightly rubbing, with a finger, a printed surface of the samples after a lapse of an hour after the printing, and visually observing the change in glossiness on the printed surface. Tables 6 to 11 show the results. Criteria A: No trace of finger rubbing found and no glossiness change. B: A traces of finger rubbing found, but glossiness hardly changed C: A traces of finger rubbing clearly found and glossiness changed.

TABLE 6

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 1-1 | A | A | A | A | A | A |
| Example 1-2 | B | B | B | B | A | B |
| Example 1-3 | B | B | B | A | A | B |
| Example 1-4 | A | A | A | A | A | A |
| Example 1-5 | A | A | A | A | A | A |
| Example 1-6 | B | A | A | A | A | B |
| Example 1-7 | B | B | A | A | A | A |
| Example 1-8 | B | B | A | A | A | A |
| Example 1-9 | B | B | A | A | A | B |
| Example 1-10 | C | C | B | A | A | A |
| Example 1-11 | C | C | C | B | A | B |

TABLE 7

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 2-1 | A | B | B | A | A | A |
| Example 2-2 | B | B | B | A | A | B |
| Example 2-3 | B | B | B | A | A | B |
| Example 2-4 | A | A | B | B | A | B |
| Example 2-5 | B | B | B | A | A | B |
| Example 2-6 | B | A | B | A | A | B |
| Example 2-7 | B | B | B | A | A | A |
| Example 2-8 | B | B | B | A | A | A |
| Example 2-9 | B | B | B | B | A | B |
| Example 2-10 | C | C | B | A | A | A |
| Example 2-11 | C | C | C | B | A | B |

TABLE 8

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 3-1 | A | A | A | A | A | A |
| Example 3-2 | B | B | B | B | A | B |
| Example 3-3 | A | A | A | A | A | A |
| Example 3-4 | A | A | A | A | A | A |
| Example 3-5 | A | A | A | A | A | A |
| Example 3-6 | A | A | A | A | A | B |

TABLE 8-continued

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 3-7 | A | A | A | A | A | A |
| Example 3-8 | A | A | A | A | A | A |
| Example 3-9 | A | A | A | A | A | B |
| Example 3-10 | C | C | B | A | A | A |
| Example 3-11 | C | C | C | A | A | B |

TABLE 9

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 4-1 | A | B | B | A | A | A |
| Example 4-2 | B | B | B | A | A | B |
| Example 4-3 | A | A | A | A | A | A |
| Example 4-4 | A | A | B | B | A | A |
| Example 4-5 | A | A | B | A | A | A |
| Example 4-6 | B | A | B | A | A | B |
| Example 4-7 | B | B | B | A | A | A |
| Example 4-8 | B | B | B | A | A | A |
| Example 4-9 | B | B | B | B | A | B |
| Example 4-10 | C | C | B | A | A | A |
| Example 4-11 | C | C | C | B | A | B |

TABLE 10

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 5-1 | B | C | C | A | A | C |
| Example 5-2 | B | B | B | A | B | B |
| Example 5-3 | B | B | B | A | C | B |
| Example 5-4 | B | C | C | A | A | C |
| Example 5-5 | B | C | C | A | A | C |
| Example 5-6 | B | B | B | A | A | C |
| Example 5-7 | B | C | C | A | A | C |
| Example 5-8 | B | C | C | A | A | C |
| Example 5-9 | B | C | C | C | B | C |
| Example 5-10 | C | C | B | A | A | A |
| Example 5-11 | C | C | C | C | A | C |

TABLE 11

| Sample | 20° Gloss (Example 1) | Image Clarity (Example 2) | Glossiness (Example 3) | Optical Density (Example 4) | Fixation (Example 5) | Gloss Change (Example 6) |
|---|---|---|---|---|---|---|
| Example 6-1 | B | C | C | A | A | C |
| Example 6-2 | B | B | B | A | B | B |
| Example 6-3 | B | B | B | A | C | B |
| Example 6-4 | B | C | C | A | A | C |
| Example 6-5 | B | C | C | A | A | C |
| Example 6-6 | B | B | B | A | A | C |
| Example 6-7 | B | C | C | A | A | C |
| Example 6-8 | B | C | C | A | A | C |
| Example 6-9 | B | C | C | C | B | C |
| Example 6-10 | C | C | B | A | A | A |
| Example 6-11 | C | C | C | C | A | C |

As described above, the inkjet recording method according to the present invention and recorded matter obtained with that inkjet recording method can have excellent glossiness, coloring ability, rubbing resistance, and fixation on a glossy recording medium.

What is claimed is:

1. An inkjet recording method for producing a black image on a recording medium by using an ink set having two or more types of ink compositions including at least one black ink composition and at least one color ink composition, wherein the recording medium has a recording surface with a 20-degree specular gloss value of 10% or larger, the 20-degree specular gloss value being a reflectance in proportion to 5% reflectance (100%) at a 20 degree incidence angle relative to a recording medium having a 1.567 refractive index, and an image clarity value of 15-95%, the image clarity value being an appearance of an object reflected on a paper surface; and wherein the discharged weight of the black ink composition upon producing the black image is 5-10 weight % in proportion to the total discharged weight (100 weight %) of the ink composition discharged upon producing the black image.

2. The inkjet recording method according to claim 1, wherein the black ink composition includes at least self-dispersing pigment as color material, and the color ink composition includes at least an organic pigment covered with water-insoluble polymer as color material.

3. The inkjet recording method according to claim 1, wherein the color ink compositions are, at the least, a yellow ink composition, a magenta ink composition, and a cyan ink composition.

4. The inkjet recording method according to claim 2, wherein the content of self-dispersing pigment in the black ink composition is 4-10 weight % in proportion to the total amount (100 weight %) of the black ink composition.

5. The inkjet recording method according to claim 1, wherein the color ink composition comprises an organic pigment and wherein the content of the organic pigment in the color ink composition is 3-8 weight % in proportion to the total amount (100 weight %) of the color ink composition.

6. A recorded matter recorded with the inkjet recording method according to claim 1.

7. A recorded matter recorded with the inkjet recording method according to claim 2.

8. A recorded matter recorded with the inkjet recording method according to claim 3.

9. A recorded matter recorded with the inkjet recording method according to claim 4.

10. A recorded matter recorded with the inkjet recording method according to claim 5.

11. The inkjet recording method according to claim 1, wherein the plurality of resin emulsions comprises more than one selected from the group consisting of acrylic resin, methacrylic resin, styrene resin, urethane resin, acrylamide resin and epoxy resin.

* * * * *